United States Patent
Knezevic et al.

(10) Patent No.: US 11,677,541 B2
(45) Date of Patent: Jun. 13, 2023

(54) METHOD AND DEVICE FOR SECURE CODE EXECUTION FROM EXTERNAL MEMORY

(71) Applicant: NXP B.V., Eindhoven (NL)

(72) Inventors: Miroslav Knezevic, Bee Cave, TX (US); Tuongvu Van Nguyen, Austin, TX (US); Durgesh Pattamatta, Camas, WA (US); Tung-Hao Huang, San Jose, CA (US)

(73) Assignee: NXP B.V., Eindhoven (NL)

( * ) Notice: Subject to any disclaimer, the term of this patent is extended or adjusted under 35 U.S.C. 154(b) by 51 days.

(21) Appl. No.: 17/450,607

(22) Filed: Oct. 12, 2021

(65) Prior Publication Data

US 2023/0114689 A1    Apr. 13, 2023

(51) Int. Cl.
 *H04L 29/06* (2006.01)
 *G06F 21/00* (2013.01)
 *H04L 9/06* (2006.01)
 *G06F 21/79* (2013.01)
 *H04L 9/08* (2006.01)

(52) U.S. Cl.
 CPC ............ *H04L 9/0631* (2013.01); *G06F 21/79* (2013.01); *H04L 9/0637* (2013.01); *H04L 9/0825* (2013.01)

(58) Field of Classification Search
 None
 See application file for complete search history.

(56) References Cited

U.S. PATENT DOCUMENTS 9,418,246 B2    8/2016   Circello et al.
9,954,681 B2 *  4/2018   Case ................... H04L 9/0894
2006/0107032 A1  5/2006   Paaske et al.
2019/0050347 A1  2/2019   Bolotov et al.
2019/0122007 A1* 4/2019   Van Antwerpen .... G06F 21/602
2021/0406381 A1* 12/2021  Heisrath ............... H04L 63/108

(Continued)

OTHER PUBLICATIONS

Ahmed, Nabihah et al.; "Advanced Encryption Standard with Galois Counter Mode Using Field Programmable Gate Array"; Journal of Physics: Conference Series, vol. 1019, 1st International Conference on Green and Sustainable Computing (ICoGeS); Nov. 25-27, 2017, Kuching, Sarawak, Malaysia; DOI: 10.1088/1742-6596/1019/1/012008.

(Continued)

*Primary Examiner* — Lisa C Lewis
(74) *Attorney, Agent, or Firm* — Daniel D. Hill (57) ABSTRACT

A method is provided for securely accessing code in an external memory. In the method, plaintext code may be stored in internal memory as sets of multiple blocks, each of the multiple blocks having N-bits. The code is encrypted and stored in the external memory. A block cipher having an authenticated encryption mode is used to convert the plaintext code to ciphertext code plus an authentication tag corresponding to each set of the multiple blocks. The external memory is formatted to store the ciphertext and the authentication tag. A translated address for the ciphertext is created from a plaintext address. During a read operation, the generated authentication tag is checked with an expected authentication tag. If the check is successful, the ciphertext code is decrypted and provided to a CPU for execution as plaintext code. In one embodiment, the CPU executes the plaintext code "in place" in the external memory.

13 Claims, 5 Drawing Sheets

(56) References Cited

U.S. PATENT DOCUMENTS

2022/0197825 A1* 6/2022 Dewan ............... G06F 15/7807
2022/0207192 A1* 6/2022 Heo ..................... H04L 9/0869

OTHER PUBLICATIONS

Dworkin, Morris; National Institute of Standards and Technology Special Publication 800-38D; Recommendation for Block Cipher Modes of Operation: Galois/Counter Mode (GCM) and GMAC; Computer Security; Nov. 2007.
NXP Semiconductors Application Note: AN13198 OTFAD performance i.MXRT1170; Rev. 0; May 19, 2021.
Werner, Mario et al.; "Transparent Memory Encryption and Authentication"; 27th International Conference on Field Programmable Logic and Application (FPL); Sep. 4-8, 2017, Ghent, Belgium; DOI: 10.23919/FPL.2017.8056797.
U.S. Appl. No. 17/246,042, filed Apr. 30, 2021; "Inline Encryption/ Decryption for a Memory Controller"; Inventor: Thomas E. Tkacik, et al.

* cited by examiner

METHOD AND DEVICE FOR SECURE CODE EXECUTION FROM EXTERNAL MEMORY

BACKGROUND

Field

This disclosure relates generally to data processing, and more particularly, to a method and device for secure code execution from external memory.

Related Art

Executing code from a memory external to a system on a chip (SoC) is commonly known as execute in place (XIP). Executing code in place provides efficient code execution and storage especially for SoCs that use external non-volatile memory (NVM). However, XIP introduces significant security risks. For example, the code stored in external memory can be manipulated at rest because an adversary is able to read and write the external memory when the SoC is powered off or in a low power mode. This may allow an attacker to defeat security mechanisms that were introduced by, for example, secure boot. An adversary may replace the existing code stored in the memory with malicious code and the SoC will not be able to detect the replacement of the code. Also, the entire contents of the external memory may be read by an attacker potentially divulging proprietary and confidential information. In recent years physical attacks on devices have been made easier by affordable equipment used to mount these attacks. This equipment can be used to mount side channel attacks and fault attacks such as power supply glitch injection or electromagnetic fault injection (EMFI).

Therefore, what is needed is a method for secure code execution from memory located external to a device.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for accessing code in an external memory that is connected to a data processing system. In one embodiment, plaintext code is first stored in internal memory in T sets of M blocks. Each block of the M blocks has N-bits of plaintext code, where T and M are both integers equal to at least two, and N is an integer. It is desirable to store the code in external memory. To protect the code from attack in the external memory, all the T sets of M blocks of plaintext code are first converted into T sets of M blocks of ciphertext code, using a block cipher having an authenticated encryption mode, where each of the blocks of ciphertext code have N-bits of ciphertext code. An N-bit first authentication tag is generated for each set of the M blocks of ciphertext code. The N-bit first authentication tag is generated using the M blocks of ciphertext code, a code version of the plaintext code, a random nonce, and a key unique to the data processing system. To read code from the external memory, a central processing unit (CPU) generates a first address for accessing the code. Before the code can be read, it must first be authenticated and then decrypted. The first authentication tag is used to authenticate the memory. The memory is then decrypted and written to internal memory in plaintext.

After encryption and storage in the external memory, the addresses of the stored ciphertext code may be different than the addresses provided by the CPU because of the inclusion of the N-bit first authentication tag. Therefore, the first address generated by the CPU has to be translated to a second address that corresponds to the external memory locations including the authentication tags. The second address is used for accessing the external memory for a read operation of the selected set of M blocks of ciphertext code and the corresponding first authentication tag. Separately, before decrypting the external memory for a read operation, a second authentication tag is calculated for the selected set of M blocks of ciphertext code. The second authentication tag is an expected authentication tag. The second expected authentication tag is checked with the first authentication tag and if the check succeeds, the selected set of M blocks of ciphertext is decrypted and read by the CPU.

The method uses a block cipher having an authenticated encryption scheme to provide both encryption and authentication for the code stored in the external memory. The method also binds the code to the CPU and provides rollback protection. Also, the method used to read the external memory uses address translation so that the memory access is transparent to the CPU. In addition, preferably, a low latency block cipher having an authenticated encryption mode is used, such as AES GCM, AES CCM, or Prince.

In accordance with an embodiment, there is provided, in a data processing system having a system-on-a-chip (SoC) connected to an external memory, a method for accessing code in the external memory, the method including: organizing plaintext code to be stored in the external memory into T sets of M blocks, each block of the M blocks having N-bits of plaintext code, wherein T is an integer equal to at least two, M is an integer, and N is an integer; using a block cipher having an authenticated encryption mode, converting all the T sets of M blocks of plaintext code into T sets of M blocks of ciphertext code, each of the blocks of ciphertext code having N-bits of ciphertext code; for each set of M blocks of ciphertext code, generating an N-bit first authentication tag; generating a first address to access the plaintext code for a read operation; translating the first address to a second address, the second address for accessing the external memory for a read operation of a set of M blocks of ciphertext code and a corresponding first authentication tag; generating a second authentication tag for the set of M blocks of ciphertext code to be read; and checking the second authentication tag with the first authentication tag and if the check succeeds, decrypting, in the SoC, the set of M blocks of ciphertext. Generating the N-bit first authentication tag may further include using a set of M blocks of ciphertext code, a code version of the plaintext code, a random nonce, and a key unique to the SoC to generate the first authentication tag corresponding to the set of M blocks of ciphertext code. Translating the first address to a second address may further include translating the first address according to the following formula: $A_{CT}=A_{PT}+A_{PT}/M$, where $A_{CT}$ is a ciphertext address, $A_{PT}$ is a plaintext address and the division symbol/indicates an integer division. The block cipher may be one of AES GCM, AES CCM, or PRINCE. The system-on-a-chip (SoC) may be implemented on a single integrated circuit and the external memory is implemented on another integrated circuit.

In another embodiment, there is provided, a method for accessing code in a memory, the method including: organizing plaintext code to be stored in the external memory into M blocks, each block of the M blocks having N-bits of plaintext code, wherein M is an integer, and N is an integer; using a block cipher having an authenticated encryption mode, converting all the M blocks of plaintext code into M blocks of ciphertext code, each of the blocks of ciphertext code having N-bits of ciphertext code; for the M blocks of ciphertext code, generating an N-bit first authentication tag, wherein the N-bit first authentication tag is generated using the M blocks of ciphertext code, a code version of the plaintext code, a random nonce, and a key unique to the data processing system; generating a first address to access the plaintext code for a read operation; translating the first address to access the external memory to a second address to access the M blocks of ciphertext code and the first authentication tag; generating a second authentication tag for the M blocks of ciphertext code to be read; and checking the second authentication tag with the first authentication tag and if the check succeeds, decrypting the M blocks of ciphertext. Translating the first address to access the external memory may further include translating the address according to the following formula: $A_{CT}=A_{PT}+A_{PT}/M$, where $A_{CT}$ is a ciphertext address, $A_{PT}$ is a plaintext address, and the division symbol/indicates an integer division. The block cipher may be one of AES GCM, AES CCM, or PRINCE. The system-on-a-chip (SoC) may be implemented on a single integrated circuit and the external memory may be implemented on another integrated circuit.

In yet another embodiment, there is provided a method for accessing code in a memory, the method including: organizing plaintext code stored in the external memory into M blocks, each block of the M blocks having N-bits of plaintext code, wherein M is an integer, and N is an integer; using a block cipher having an authenticated encryption mode, converting all the M blocks of plaintext code into M blocks of ciphertext code, each of the blocks of ciphertext code having N-bits of ciphertext code; for the M blocks of ciphertext code, generating an N-bit first authentication tag; generating a first address to access the plaintext code for a read operation; and translating the first address to access the external memory to a second address to access the M blocks of ciphertext code and the first authentication tag, the translating performed according to the formula: $A_{CT}=A_{PT}+A_{PT}/M$, where $A_{CT}$ is a ciphertext address and $A_{PT}$ is a plaintext address; generating a second authentication tag for the M blocks of ciphertext code to be read; and checking the second authentication tag with the first authentication tag and if the check succeeds, decrypting the M blocks of ciphertext. The N-bit authentication tag may further include using the M blocks of ciphertext code, a code version of the plaintext code, a random nonce, and a key unique to the data processing system to generate the authentication tag corresponding to the set of M blocks of ciphertext code. The block cipher may be one of AES GCM, AES CCM, or PRINCE. The system-on-a-chip (SoC) may be implemented on a single integrated circuit and the external memory may be implemented on another integrated circuit.

Figure 1:
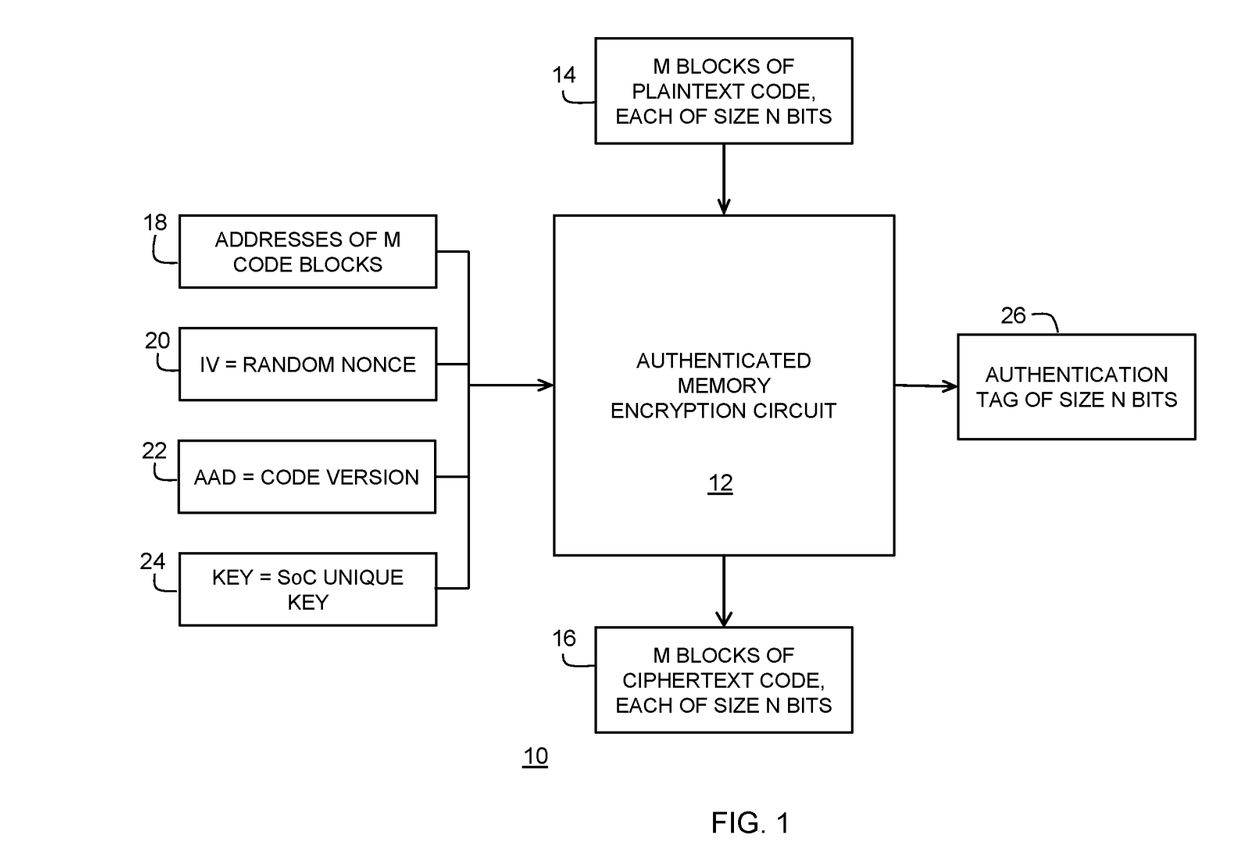
FIG. 1 illustrates authenticated encryption of a memory in accordance with an embodiment.

FIG. 1 illustrates a simplified diagram of authenticated encryption 10 of a memory in accordance with an embodiment. In the illustrated embodiment, a symmetric block cipher in authenticated encryption mode such as advanced encryption standard with Galois counter mode (AES GCM), is used. Other examples of block ciphers that have an authenticated encryption mode include advanced encryption standard customer communication management (AES CCM) and Prince. Authenticated encryption mode provides code and/or data encryption while also providing code and/or data authentication. In FIG. 1, authenticated memory encryption circuit 12 includes hardware, software, or a combination of hardware and software to perform encryption, decryption, and authentication of the contents of a memory. In one embodiment, the memory may be a non-volatile memory (NVM), such as a flash memory. Also, the memory may be considered "external" to a data processing system such as a system-on-a-chip (SoC) integrated circuit, wherein the memory is external to the SoC because it is not implemented on the same integrated circuit as the SoC to which it is connected. Being external in this way makes the memory more vulnerable to attacks than an embedded memory.

Figure 2:
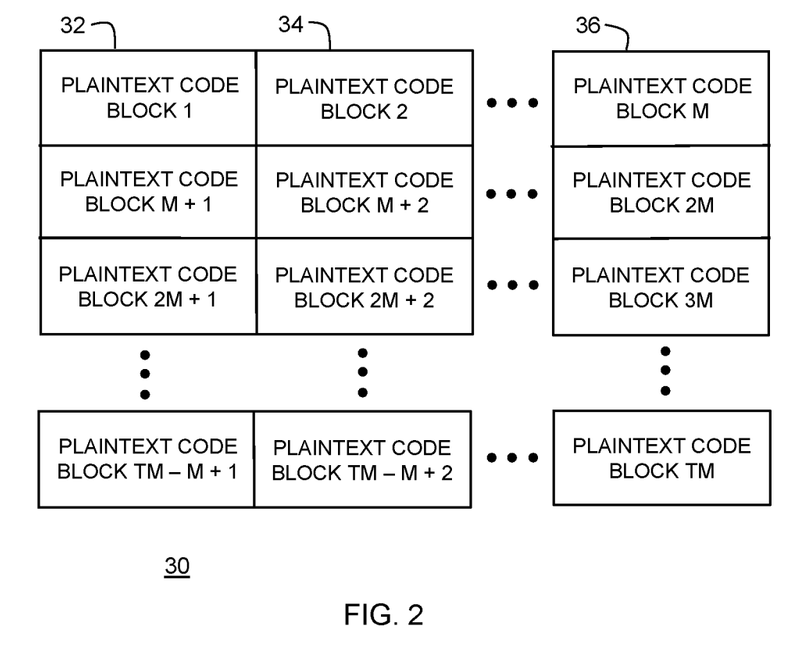
FIG. 2 illustrates formatting of memory content prior to encryption in accordance with an embodiment.

In accordance with an embodiment, an external memory (not shown) includes a plurality of memory cells organized in blocks, where N is used to denote a block size, or the number of memory cells in a block. In one embodiment, N is greater than or equal to 64 bits. More specifically, at step 14, the memory blocks of plaintext code are organized into multiple sets of blocks, where one set T has M number of blocks. A memory array formatted as described is shown in FIG. 2. During encryption, an authentication tag is associated with each M set of blocks. Using one of the block ciphers that has an authenticated encryption mode, authenticated memory encryption circuit 12 encrypts all the N blocks of the memory to produce N blocks of ciphertext at step 16.

When the external memory is encrypted, an authentication tag is produced by authenticated memory encryption circuit 12 to correspond with M ciphertext code blocks. In the illustrated embodiment, addresses of the M code blocks, a random nonce, code version, and a key are used to produce the authentication tag. To generate the authentication tag, authenticated memory encryption circuit 12 uses, at step 18, the addresses of M ciphertext code blocks. The addresses of every plaintext code block of the M ciphertext code blocks are used to produce a unique input to the authenticated memory encryption circuit 12. At step 20, an initialization vector (IV) may be input to the AES GCM block cipher and includes a random nonce. The random nonce is used to make the input to the authenticated memory encryption circuit 12 unknown to an adversary that tries to mount a side-channel attack. In another embodiment, the IV may be based on a monotonic counter and may be stored on the SoC (for example, in an internal NVM). At step 22, additional authentication data (AAD) may be input to the block cipher and includes the code version of the code stored in the external memory. At step 24, a key is generated. The key is unique to the SoC in order to bind the encrypted content residing in the external memory with the one SoC. For example, the key may be derived from a physically unclonable function (PUF). The key is assumed to be 128 bits or more. M plaintext code blocks are bound together to produce M ciphertext code blocks and a single authentication tag that ensures the integrity of the M ciphertext code blocks.

FIG. 2 illustrates the formatting of the content of memory 30 prior to encryption in accordance with an embodiment. Memory 30 may be an internal memory, such as a static random-access memory (SRAM). In accordance with the described embodiment, an internal memory is implemented on the same IC as a processor that accesses code from memory 30. Before the plaintext code is encrypted, the plaintext code is divided into T*M blocks, where each of the code blocks are size N-bits, and the asterisk (*) represents a multiplication operation. In FIG. 2, each row includes M plaintext blocks. As an example, the first row of memory 30 includes N-bit blocks 32, 34, and 36 that make up M N-bit blocks of plaintext code.

Figure 3:
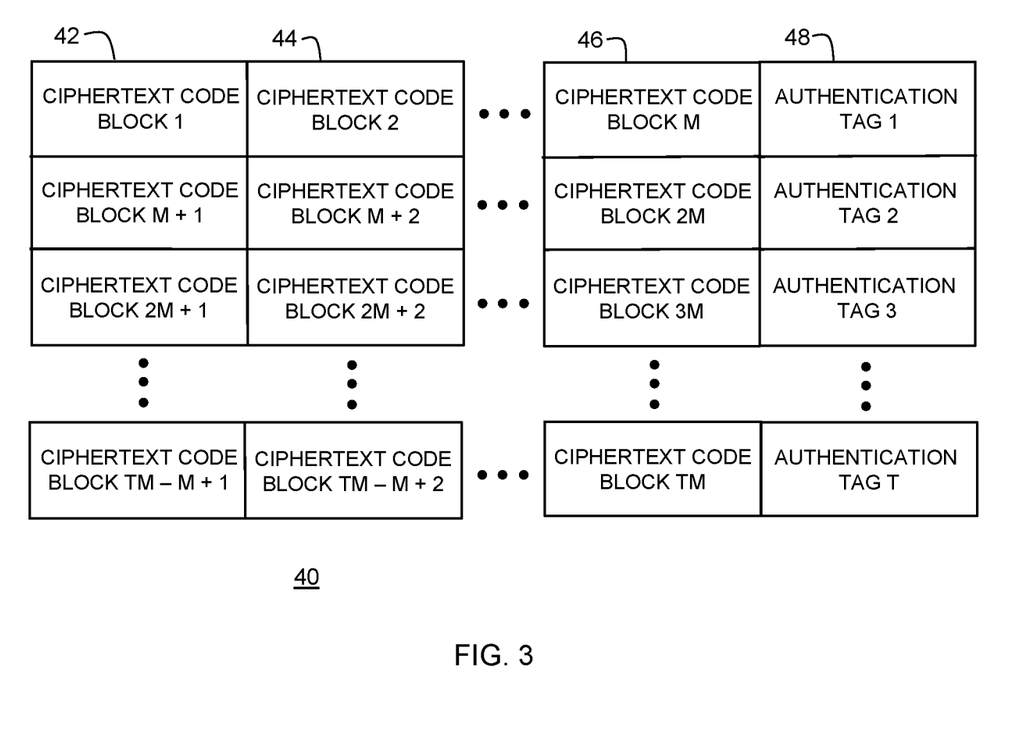
FIG. 3 illustrates formatting of memory content after encryption with a block cipher having an authenticated encryption mode.

Using a block cipher, every plaintext code block is converted into its ciphertext counterpart. FIG. 3 illustrates the formatting of memory 40 content after encryption of the contents of memory 30 of FIG. 2 with a block cipher having an authenticated encryption mode. Memory 40 may be a memory external to a system implemented on an IC. In one embodiment, memory 40 is a flash memory. M ciphertext code blocks are used to produce a single authentication tag. In FIG. 3, each row of memory 40 includes M blocks of ciphertext code. For example, ciphertext blocks 42, 44, and 46 represent the M blocks and are used to generate authentication tag 48. Authenticated memory encryption circuit 12 reformats the N blocks of ciphertext with the authentication tag(s) associated with each of the M N-bit blocks and stores the M N-bit blocks in the external memory 40. Memory overhead is equal to 1/M. Memory 40 is read M blocks at a time. In one embodiment, any bus master of a device, e.g., CPU, direct memory access (DMA) controller, graphics processing unit (GPU), etc., will first communicate with cache, and cache will further communicate with the external memory. Performance overhead depends on the actual computer architecture. Factors like physical and logical placement of the authentication tag, memory word width, memory access time, size of the internal cache, cache hit rate, and other factors will have a role in selecting the optimal M for minimizing the performance overhead. The method for securely accessing the memory is independent of the type of authenticated encryption used. However, some algorithms have performance and area advantages over some others. AES GCM and AES CCM are good choices, especially in cases where silicon area is not a scarce resource. Low-latency encryption algorithms such as Prince in Galois counter mode (GCM) mode may be a better choice in cases where high performance and low area are important requirements.

Figure 4:
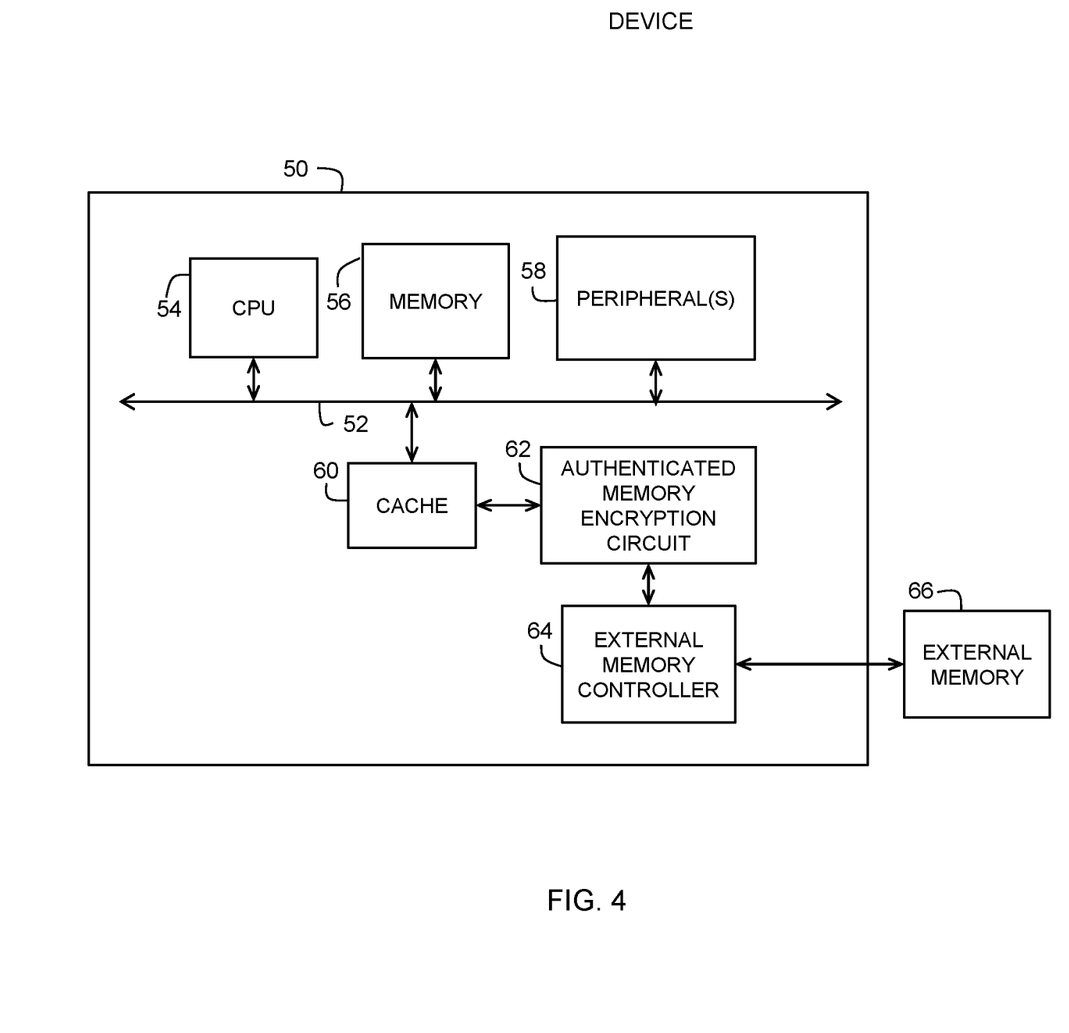
FIG. 4 illustrates a data processing system in accordance with an embodiment.

FIG. 4 illustrates a data processing system having SoC 50 connected to external memory 66 in accordance with an embodiment. In one embodiment, SoC 50 is implemented on a single integrated circuit and external memory 66 is implemented on a second, separate, integrated circuit. SoC 50 includes system bus 52, central processing unit (CPU) 54, memory 56, one or more peripherals 58, cache 60, authenticated memory encryption circuit 62, external memory controller 64, and external memory 66. In SoC 50, all the various circuits and functional blocks are coupled to bus 52. Bus 52 may be any type of bus. In another embodiment, bus 52 may be a switched network.

CPU 54 may include any hardware device capable of executing instructions stored in memory. For example, CPU 54 may execute applications related to functionality provided by a product in which SoC 50 has been made a part of. For example, SoC 50 may be used in internet of things (IoT) products. CPU 54 may be implemented as, for example, a microprocessor, a field programmable gate array (FPGA), an application-specific integrated circuit (ASIC), GPU, or similar device. CPU 54 may include multiple processor cores (not shown). CPU 54 may be implemented in a secure hardware element (not shown) and may be tamper resistant. As described above, any bus master of SoC 50, e.g., CPU 54, a DMA controller, a GPU, etc., that needs to access external memory 66 will first communicate with cache, such as cache 60, and cache 60 will further communicate with external memory 66.

Memory 56 may be any kind of internal memory, such as for example, a volatile memory such as static random-access memory (SRAM) or dynamic RAM (DRAM), or may include non-volatile memory such as flash memory, read only memory (ROM), or other volatile or non-volatile memory. Also, memory 56 may be implemented in a secure hardware element (not shown). In one embodiment, memory 56 may be used to store data used by instructions executed by CPU 54.

Peripheral(s) 58 may be one or more various types of circuits. The types of peripheral(s) depends on the functionality needed by the product in which SoC 50 is implemented. Examples of peripherals may include an analog-to-digital converter (ADC), a phase locked loop (PLL), an input/output (I/O) circuit, a modem, etc. In one embodiment, any of peripherals 58 can be master of bus 52.

Cache 60 may be any kind of cache such as, for example, an L1, L2, or L3 cache. Cache 60 may be used to temporarily store instructions for use by CPU 54. Executing instructions from cache 60 is generally faster than executing instructions from other types of memory.

Authenticated memory encryption circuit 62 is bidirectionally connected to cache 60. External memory controller 64 is bidirectionally connected to both authenticated memory encryption circuit 62 and external memory 66. Authenticated memory encryption circuit 62 interfaces with external memory 66 through external memory controller 64. During a read operation by CPU 54, addresses from CPU 54 need to be modified, or translated, by external memory controller 64 in order to handle the overhead brought in by the use of authentication tags. CPU 54 reads M blocks of external memory at a time. The address translation will make sure that the correct address is provided to external memory 66. Also, the address translation will make sure the authentication tags are automatically fetched during the same read operation of M blocks of ciphertext.

During a read operation from external memory 66, an address is provided by CPU 54. The address used by CPU 54 is for plaintext code as illustrated in FIG. 2. The M blocks of plaintext code are encrypted by authenticated memory encryption circuit 62 to protect them from attack. Authenticated memory encryption circuit 62 encrypts the plaintext to generate ciphertext. Authenticated memory encryption circuit 62 also generates a corresponding authentication tag as discussed above regarding FIG. 1 and stores the M blocks of ciphertext and the authentication tag in the external memory as illustrated in FIG. 3. When the plaintext is encrypted and an authentication tag is added for each M blocks, the address may change for at least some of the ciphertext blocks. External memory controller 64 translates the plaintext address to a ciphertext address using the formula $A_{CT}=A_{PT}+A_{PT}/M$, where $A_{CT}$ is a ciphertext address, $A_{PT}$ is a plaintext address, and the division symbol / indicates integer division. The ciphertext addressing and the plaintext addressing will work on the N-bit level as disclosed. The ciphertext is stored at the calculated addresses. Before decrypting, authenticated memory encryption circuit 62 checks the authentication tag for authenticity. In one embodiment, an expected authentication tag is calculated by authenticated memory encryption circuit 62 and the generated authentication tag stored in external memory 66 with the M blocks of ciphertext code is checked with the expected authentication tag. If the authentication tags match, then the check is successful and the ciphertext code is decrypted and provided to CPU 54. Also, the ciphertext code may be overwritten by the decrypted code in memory 66.

In one embodiment, memory 66 is an NVM. Also, in one embodiment, CPU 54 may execute instructions directly from memory 66 after authenticating and decrypting memory 66 without first storing the instructions in cache 60.

Figure 5:
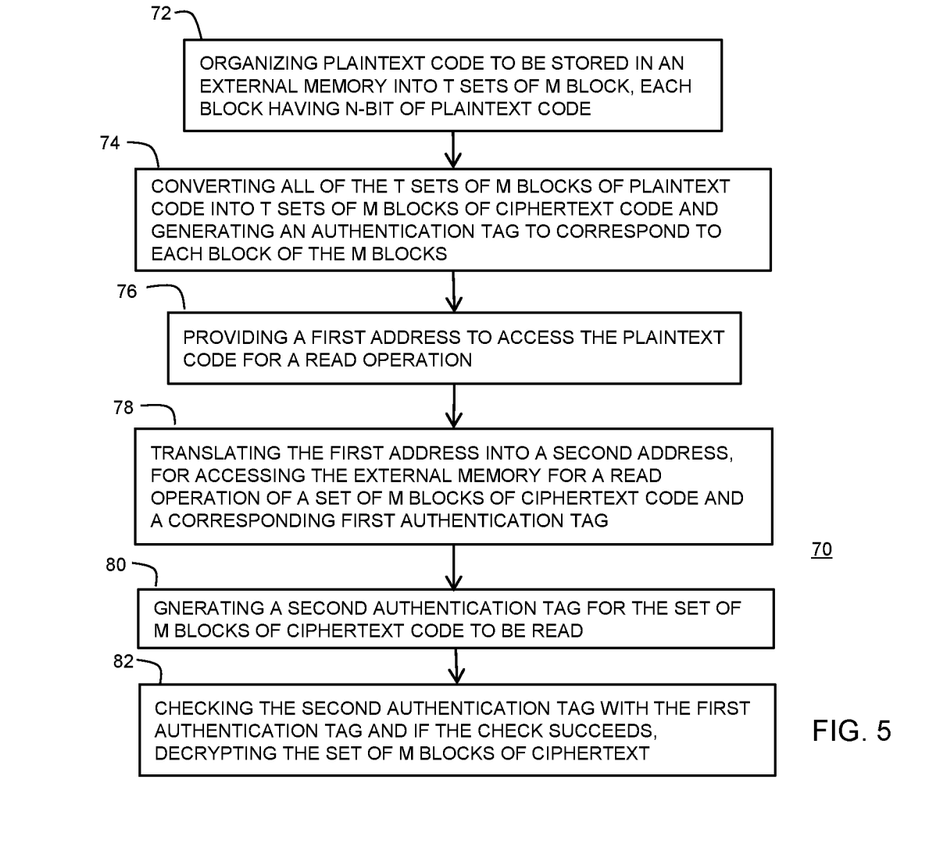
FIG. 5 illustrates a method for accessing code in a memory external to a data processing system in accordance with a embodiment.

FIG. 5 illustrates a method 70 for accessing code in a memory external to a data processing system in accordance with an embodiment. Method 70 begins at step 72. At step 72, plaintext code to be stored in external memory is organized as T sets of M blocks of memory. Each block of the M blocks having N-bits of plaintext code, where T is an integer equal to at least two, M is an integer equal to at least two, and N is an integer. At step 74, a block cipher having an authenticated encryption mode is used to convert all the T sets of M blocks of plaintext code into T sets of M blocks of ciphertext code. Also, an authentication tag is generated for each set of M blocks of memory. Each of the blocks of ciphertext code has N-bits of ciphertext code. At step 76, a first address is generated by the CPU to access the plaintext code for a read operation. That is, the first address is for accessing the internal memory with plaintext code. However, the code has been encrypted and stored as ciphertext code in external memory. In order to access the external memory, at step 78, the first address, known by the CPU, is translated into a second address. In one embodiment, a translation formula set out above is used. Specifically, the second address is for accessing the external memory for a read operation of a set of M blocks of ciphertext code and a corresponding first authentication tag. Before, the read operation, the ciphertext code has to be authenticated and decrypted. The first authentication tag is used to authenticate one set of the M blocks of ciphertext code. Each set of M blocks has an authentication tag. At step 80, a second authentication tag is generated separately for the set of M blocks of ciphertext to be read. That is, the second authentication tag is a calculated expected authentication tag. At step 82, the expected second authentication tag is checked with the first authentication tag. If the check succeeds, the set of M blocks of ciphertext code are decrypted.

The method uses a block cipher having an authenticated encryption scheme to provide both code encryption and authentication for the code stored in the external memory. The method also binds the code to the CPU and provides rollback protection. Also, the method used to read the external memory uses address translation so that the memory access is transparent to the CPU. In addition, preferably, a low latency block cipher having an authenticated encryption mode is used, such as AES GCM, AES CCM, or Prince.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system having a system-on-a-chip (SoC) connected to an external memory, a method for accessing code in the external memory, the method comprising:
   organizing plaintext code to be stored in the external memory into T sets of M blocks, each block of the M blocks having N-bits of plaintext code, wherein T is an integer equal to at least two, M is an integer, and N is an integer;
   using a block cipher having an authenticated encryption mode, converting all the T sets of M blocks of plaintext code into T sets of M blocks of ciphertext code, each of the blocks of ciphertext code having N-bits of ciphertext code;
   for each set of M blocks of ciphertext code, generating an N-bit first authentication tag;
   generating a first address to access the plaintext code for a read operation;
   translating the first address to a second address, the second address for accessing the external memory for a read operation of a set of M blocks of ciphertext code and a corresponding first authentication tag;
   generating a second authentication tag for the set of M blocks of ciphertext code to be read; and
   checking the second authentication tag with the first authentication tag and if the check succeeds, decrypting, in the SoC, the set of M blocks of ciphertext.

2. The method of claim 1, wherein generating the N-bit first authentication tag further comprises using a set of M blocks of ciphertext code, a code version of the plaintext code, a random nonce, and a key unique to the SoC to generate the first authentication tag corresponding to the set of M blocks of ciphertext code.

3. The method of claim 1, wherein translating the first address to a second address further comprises translating the first address according to the following formula: $A_{CT} = A_{PT} +$ $A_{PT}/M$, where $A_{CT}$ is a ciphertext address, $A_{PT}$ is a plaintext address and the division symbol/indicates an integer division.

4. The method of claim 1, wherein the block cipher is one of AES GCM, AES CCM, or PRINCE.

5. The method of claim 1, wherein the system-on-a-chip (SoC) is implemented on a single integrated circuit and the external memory is implemented on another integrated circuit.

6. A method for accessing code in a memory, the method comprising:

organizing plaintext code to be stored in the external memory into M blocks, each block of the M blocks having N-bits of plaintext code, wherein M is an integer, and N is an integer;

using a block cipher having an authenticated encryption mode, converting all the M blocks of plaintext code into M blocks of ciphertext code, each of the blocks of ciphertext code having N-bits of ciphertext code;

for the M blocks of ciphertext code, generating an N-bit first authentication tag, wherein the N-bit first authentication tag is generated using the M blocks of ciphertext code, a code version of the plaintext code, a random nonce, and a key unique to the data processing system;

generating a first address to access the plaintext code for a read operation;

translating the first address to access the external memory to a second address to access the M blocks of ciphertext code and the first authentication tag;

generating a second authentication tag for the M blocks of ciphertext code to be read; and checking the second authentication tag with the first authentication tag and if the check succeeds, decrypting the M blocks of ciphertext.

7. The method of claim 6, wherein translating the first address to access the external memory further comprises translating the address according to the following formula: $A_{CT}=A_{PT}+A_{PT}/M$, where $A_{CT}$ is a ciphertext address, $A_{PT}$ is a plaintext address, and the division symbol/indicates an integer division.

8. The method of claim 6, wherein the block cipher is one of AES GCM, AES CCM, or PRINCE.

9. The method of claim 6, wherein the system-on-a-chip (SoC) is implemented on a single integrated circuit and the external memory is implemented on another integrated circuit.

10. A method for accessing code in a memory, the method comprising:

organizing plaintext code stored in the external memory into M blocks, each block of the M blocks having N-bits of plaintext code, wherein M is an integer, and N is an integer;

using a block cipher having an authenticated encryption mode, converting all the M blocks of plaintext code into M blocks of ciphertext code, each of the blocks of ciphertext code having N-bits of ciphertext code;

for the M blocks of ciphertext code, generating an N-bit first authentication tag;

generating a first address to access the plaintext code for a read operation; and translating the first address to access the external memory to a second address to access the M blocks of ciphertext code and the first authentication tag, the translating performed according to the formula: $A_{CT}=A_{PT}+A_{PT}/M$, where $A_{CT}$ is a ciphertext address and $A_{PT}$ is a plaintext address;

generating a second authentication tag for the M blocks of ciphertext code to be read; and checking the second authentication tag with the first authentication tag and if the check succeeds, decrypting the M blocks of ciphertext.

11. The method of claim 10, wherein the N-bit authentication tag further comprises using the M blocks of ciphertext code, a code version of the plaintext code, a random nonce, and a key unique to the data processing system to generate the authentication tag corresponding to the set of M blocks of ciphertext code.

12. The method of claim 10, wherein the block cipher is one of AES GCM, AES CCM, or PRINCE.

13. The method of claim 10, wherein the system-on-a-chip (SoC) is implemented on a single integrated circuit and the external memory is implemented on another integrated circuit.

* * * * *